US011896551B2

(12) United States Patent
Wooten

(10) Patent No.: US 11,896,551 B2
(45) Date of Patent: Feb. 13, 2024

(54) MEDICATION INFORMATION AND STORAGE DEVICE

(71) Applicant: Raymond T Wooten, Clemson, SC (US)

(72) Inventor: Raymond T Wooten, Clemson, SC (US)

( * ) Notice: Subject to any disclaimer, the term of this patent is extended or adjusted under 35 U.S.C. 154(b) by 763 days.

(21) Appl. No.: 15/255,198

(22) Filed: Sep. 2, 2016

(65) Prior Publication Data

US 2017/0231868 A1 Aug. 17, 2017

Related U.S. Application Data

(63) Continuation-in-part of application No. 29/554,429, filed on Feb. 11, 2016, now Pat. No. Des. 782,922, and a continuation-in-part of application No. 29/554,427, filed on Feb. 11, 2016, now Pat. No. Des. 782,921.

(51) Int. Cl.
*A61J 1/03* (2023.01)
*A45C 1/06* (2006.01)

(52) U.S. Cl.
CPC ................. *A61J 1/035* (2013.01); *A45C 1/06* (2013.01); *A45C 2001/065* (2013.01); *A61J 2205/30* (2013.01)

(58) Field of Classification Search
CPC ......... A61J 1/035; A61J 2205/30; A45C 1/06; A45C 2001/065
USPC ....... 206/461, 462, 463, 467, 469, 470, 471, 206/779, 37, 38, 459.4, 232, 828, 8, 28
See application file for complete search history.

(56) References Cited

U.S. PATENT DOCUMENTS

| | | | | |
|---|---|---|---|---|
| 1,816,542 | A * | 7/1931 | Mellin | B65D 73/0092 206/463 |
| 3,526,317 | A * | 9/1970 | Vanders | B65D 75/54 206/217 |
| 4,384,649 | A | 5/1983 | Brodsky | |
| 4,884,693 | A | 12/1989 | Brutsch | |
| 4,889,236 | A | 12/1989 | Bartell et al. | |
| 6,592,378 | B2 * | 7/2003 | Norberg | G09B 23/28 206/232 |
| 7,959,004 | B2 | 6/2011 | Tsao | |
| 8,376,140 | B2 | 2/2013 | Eisenberg | |
| 8,382,728 | B1 | 2/2013 | Gibson | |
| 2002/0066690 | A1 * | 6/2002 | Mattis | A61J 1/03 206/532 |

(Continued)

*Primary Examiner* — J. Gregory Pickett
*Assistant Examiner* — Jenine Pagan
(74) *Attorney, Agent, or Firm* — Southeast IP Group LLC; Thomas L. Moses

(57) ABSTRACT

A medication information and storage device that provides easy, on-hand, transportation and storage of medication and information regarding a health condition for which the medication may, in an emergency, stop or limit certain, possibly life-threatening, symptoms. The device includes a card with printed information, such as symptoms, treatments, and how to best take accompanying medication, and a cavity containing medication disposed in a corner of the card. In use, the device is carried upon a person, such as in a wallet, retrieved and read by a person when experiencing a health condition, and opened to provide medication for the health condition, if the person believes after reading the information that taking the medication may help.

9 Claims, 9 Drawing Sheets

(56) References Cited

U.S. PATENT DOCUMENTS

| | | | | |
|---|---|---|---|---|
| 2003/0098257 | A1* | 5/2003 | Robertson | A61J 7/0076 206/538 |
| 2005/0056564 | A1* | 3/2005 | Higgins | B65D 75/327 206/534 |
| 2006/0138009 | A1 | 6/2006 | Bozkurt | |
| 2006/0254949 | A1* | 11/2006 | Staggs | A61J 1/03 206/528 |
| 2007/0235350 | A1* | 10/2007 | Warlick | A44B 15/005 206/37 |
| 2009/0241483 | A1 | 10/2009 | Detwiler et al. | |
| 2010/0326877 | A1 | 12/2010 | Hemmerlin et al. | |
| 2012/0145586 | A1 | 6/2012 | Doyle et al. | |
| 2015/0238386 | A1 | 8/2015 | Wallace | |
| 2015/0272826 | A1* | 10/2015 | Alonso | B65D 75/367 206/459.5 |
| 2015/0329258 | A1* | 11/2015 | Brandow | B65D 73/0092 206/462 |

* cited by examiner

MEDICATION INFORMATION AND STORAGE DEVICE

BACKGROUND OF THE INVENTION

There are many health conditions for which the immediate consumption of a medication by an individual can fully or partially offset potentially life-threatening symptoms. A very well-known example is the ingestion of aspirin at the first signs of a heart attack. Most medications, including those where immediate consumption could be helpful, like aspirin, are sold in multiple dose packaging, such as bottles, blister packs, and boxes. However, for most health conditions where immediate consumption could stop or lessen symptoms, a single dose is all that is required to be immediately consumed. For example, just one regular aspirin a be enough to help lessen the symptoms of a heart attack if taken at the first signs thereof. Multiple dose packaging can be bulky and inconvenient to transport and keep on an individual's person for emergencies. Further, these packages normally include information on the medication but not the health conditions and symptoms which may require the immediate consumption of the medication. Therefore, an individual must often memorize and recall important information regarding health conditions, symptoms, and medication during an emergency.

Wallets have become an important accessory that people carry around on a daily basis to conveniently and securely store and transport various important documents, such as IDs and credit cards. Most wallets come with standard sized card slots into which most credit cards and IDs can be inserted to prevent them from falling out or shifting around and being lost or stolen. These slots are often stacked so that multiple cards may be stored in a compact space within the wallet. However, these stacked slots often increase the thickness of and create pressure within a wallet as the slots are filled. Moreover, the physical dimensions of the card slots and increasing pressure as the slots are filed prevent wallets from normally being utilized to secure and store medication. The physical dimensions of the card slot hinders the easy insertion of medication or packaging containing medication, particularly if other cards are in adjoining card slots. Further, the pressure created within the wallet can damage medication if the wallet is folded, sat on, or even just squeezed, particularly when other cards are stored within the wallet.

Devices and packaging have been developed for the secure and convenient transport of medication. For example, relatively small, reusable pillboxes are known in the art for the specific purpose of storing oral medication. However, pillboxes fail to fit comfortably and reliably within a pocket or other means for carrying medication on an individual's person, such as a wallet card slot. Further, pillboxes are not normally produced with information related to conditions and symptoms wherein immediate consumption of medication may stop or lessen health effects.

Additionally, blister packs having perforations for the detachment of a single dose are known in the art for the storage and transport of medication. Single dose blister packs may fit in a pocket or a bag. However, they do not fit in a wallet card slot and can easily be lost or misplaced with the other contents of pockets bags and purses, such as spare change, chewing gum wrappers, and car keys. In a medical emergency where immediate consumption of medication would help, it is inconvenient and possibly dangerous to have that medication be difficult to find or, worse, lost. Further, information on these conditions and when medication may be necessary cannot easily or usefully be printed upon a single dose blister pack. Therefore, an individual is left to remember or look up information of the health condition, including symptoms, treatments, and medication dosages, which can cause errors and wasted time.

Examples of other devices developed to securely and conveniently transport medication include the following: U.S. Patent Application Publication Number 2005/0056564 discloses a personal wallet pill card comprising a card like configuration that provides transportation, easy access storage, and a method to protect the medication from harm while being transported in a wallet. The pill card achieves these goals by utilizing the top upper pocket section of a wallet; where there is the only open space, allowing the storage without making the wallet thicker or applying pressure to the oral medications.

U.S. Patent Application Publication Number 2007/0235350 discloses a carrying case in the size of a credit card. The carrying case has a front panel and a rear panel when joined in an overlapping manner has a size of about 86 mm (3.4 inches) or less in length by about 54 mm (2.1 inches) or less in width. Therefore, this carrying case is substantially the same size as specified for a credit card, but can be up to two to three times thicker, about 9.0 mm or less. Preferably the device is about the same thickness as a conventional credit card which is 3.0 mm or less. Medications or breath fresheners are disposed between the two panels, preferably in flat sheets.

U.S. Pat. No. 7,959,004 discloses a safe packaging container made to be folded or rolled where the opening surface thereof is hidden by use of a cooperative fixing element, so that the contents loaded in the packing container are protected safely from being destroyed and so that the packing container is not easy to open. The structure design can be applied to improve the conventional blister-type packaging container, which has the disadvantage of being easy to open and therefore poses a risk of accidental child ingestion. Moreover, the folded or rolled safe packaging container has a reduced volume and weight and therefore is more convenient for transporting.

U.S. Patent Application Publication Number 2012/0145586 discloses an apparatus for delivering single-dose packages sequentially from a substantially continuous strip having a first dispensing end and a second end. The strip includes a cover layer attached to a base layer to define a plurality of blisters there-between that have one or more medications therein. The blisters are aligned in single file generally along the longitudinal axis between the first and second ends and/or otherwise arranged in single-dose packages adjacent one another, e.g., at least some of the single-dose packages including a plurality of blisters having different types of medications therein. A first single-dose package at the first dispensing end may be separable from a second adjacent single-dose package such that individual single-dose packages may be removed successively from the first dispensing end.

U.S. Patent Application Publication Number 2015/0238386 A1 discloses a personal wallet medication card apparatus which is at most the dimensions of a credit card and having at least one sealed cavity which conveniently and safely retains medication for use in an emergency. One embodiment of the present invention facilitates telecommunication with medical persons or entities in an urgent medical event by using a scannable code encoding a prompt on a mobile telecommunication device for medical communications or other information. Each of the references mentioned above are hereby incorporated herein, in their entirety, by reference.

However, these earlier efforts suffer from one or more of the following disadvantages: The devices do not provide convenient, easy, and discreet access to medication, are not designed to fit within a wallet card slot, do not protect the medications from being crushed if secured in a wallet card slot, and do not have printed information on health conditions requiring such medications, including symptoms, and when consumption is necessary to stop or lessen the potentially life-threatening effects thereof.

For these reasons, a need exists for a disposable or reusable device that retains medication in a secure, convenient, and protected manner within a wallet credit card slot so it may be transported by an individual and be on hand when necessary, and which has printed information on health conditions requiring a retained medication, including symptoms, and when consumption is necessary to stop or lessen the potentially life-threatening effects thereof.

BRIEF SUMMARY OF THE INVENTION

The present invention is directed to a device that, in one or more aspects, is of disposable or reusable design which retains medication in a secure, convenient, and protected manner, fits within a wallet credit card slot, may be easily and securely transported by an individual, may be on hand when necessary, and has printed information on a health condition requiring medication. Other advantages of one or more aspects will be apparent from the drawings and ensuing description.

In accordance with one embodiment, a medication information and storage device has a card with surfaces, edges, a cavity for medication in a corner of the card, and information regarding the medication and a health condition requiring it on one of the card's surfaces. The card of the device may be shaped and sized similar to a standard credit card so it fits within standard wallet credit card slots for easy and secure transportation. Additionally, the cavity of the device may be unsealed or sealed in a one-use or resealable manner. In operation, an individual keeps this device for a particular health condition with medication that can help stop or lessen the negative effects of that condition on their person, such as in a card slot in their wallet, so they know exactly where the medication is located and have it on hand when needed. When that individual begins experiencing symptoms of what is believed to be that particular health condition, such as a heart attack, they retrieve the device and read the information about the condition and the medication for the condition printed on the card. If, after reading that information, the individual still believes they are experiencing the condition and that taking the medicine would benefit them, they remove the medication from the cavity and consume it.

Further, in one embodiment, the device may have two cards connected together which may be folded onto one another to add additional space for information. The cards thereof may have the same or different shapes and or sizes to facilitate the printing or reading of information. Further, the cards thereof may be partially affixed to one another in a permanent or removable manner, thereby allowing the cards to be separated. In a further embodiment, the cards may have glue or some other attachments to secure the cards when folded together, to prevent damage to the device. In addition, one or both cards may have cavities which, in certain embodiments, may adjoin each other when the cards are folded together, to seal medication therein.

Moreover, a single card device may also have a shape that is not similar to a credit card, such as that of a triangle, trapezoid, kite, rhombus, square, or an irregular polygon. The device and its elements, in any embodiment, may be constructed from or with any desired materials which, in one or more aspects, allow for the storage and transportation of medication in a secure, convenient, and protected manner, the easy insertion of the device into a wallet credit card slot, the medicine to be on hand when necessary, and thereupon information about a health condition and the relevant medicine may be printed. Examples of possible materials include, but are not limited to, paper, cardboard, polymer, cloth, wood, metal, and rubber.

BRIEF DESCRIPTION OF THE DRAWINGS

These and other features, aspects, and advantages of the present invention will become better understood with regard to the following description, appended claims, and accompanying drawings where:

REFERENCE NUMERALS

| | | | |
|---|---|---|---|
| 10 | Medical Information and Storage Device | 12 | Card |
| | | 16 | Second Card |
| 14 | First Card | 20 | Rear Surface |
| 18 | Front Surface | 24 | Top Edge |
| 22 | Edges | 28 | Side Edge |
| 26 | Bottom Edge | 32 | Information |
| 30 | Connection Point | 36 | Means for Securing Cards in Folded Contact |
| 34 | Cavity | | |

-continued

| | | | |
|---|---|---|---|
| 40 | Wallet | 42 | Card Slot |
| 44 | Credit Card | | |

DETAILED DESCRIPTION OF THE INVENTION

Definitions

The term “comprises” and grammatical equivalents thereof are used herein to mean that other components, ingredients, steps, etc. are optionally present. For example, an article “comprising” (or “which comprises”) components A, B, and C can consist of (i.e., contain only) components A, B, and C, or can contain not only components A, B, and C but also one or more other components.

The term “medication” and “medications” are used herein to mean one or more doses, tablets, pills, capsules, or other form of substances—comprising supplements, vitamins, minerals, herbs, compounds, and combinations thereof—which may be utilized by an individual for any purpose, including supplementation and medical treatment.

Medication Information and Storage Device

Figure 1A:
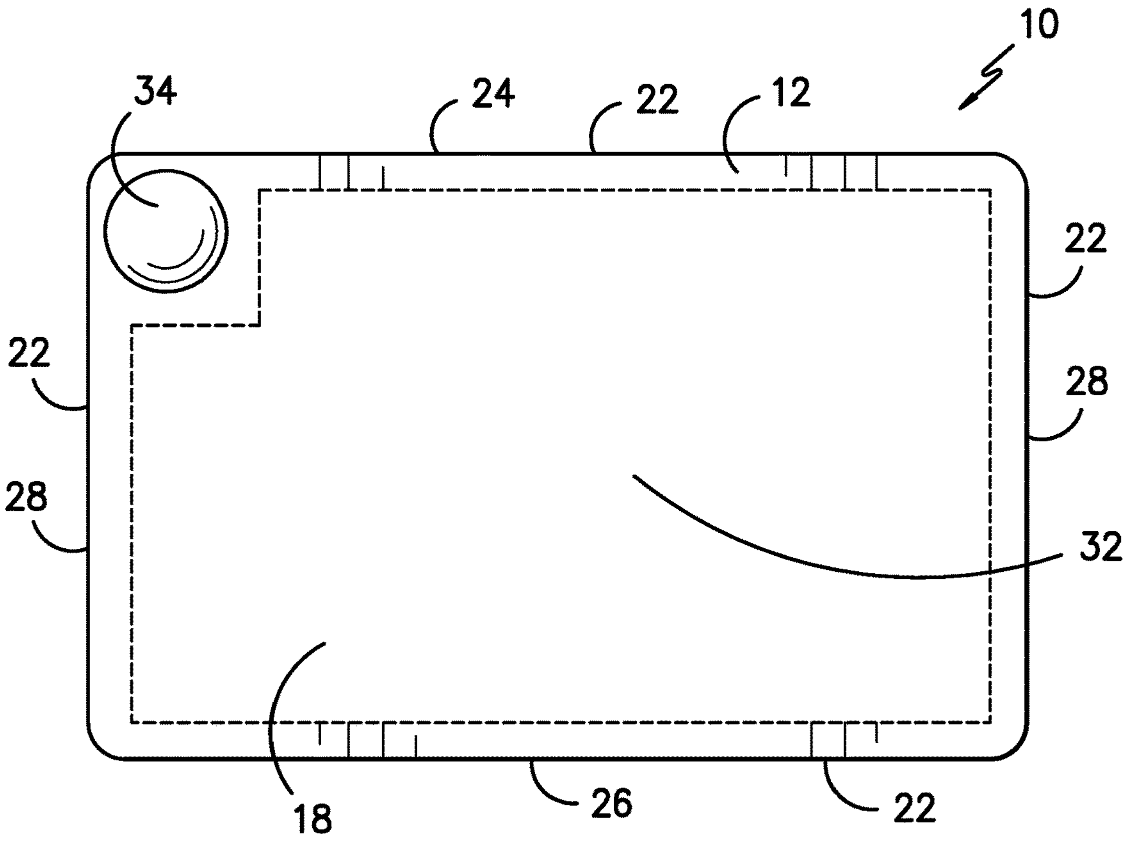
FIG. 1A is a front elevation view of one embodiment of a medication information and storage device with a card and cavity and where information about a health condition can be printed within the area defined by the broken.
Figure 1B:
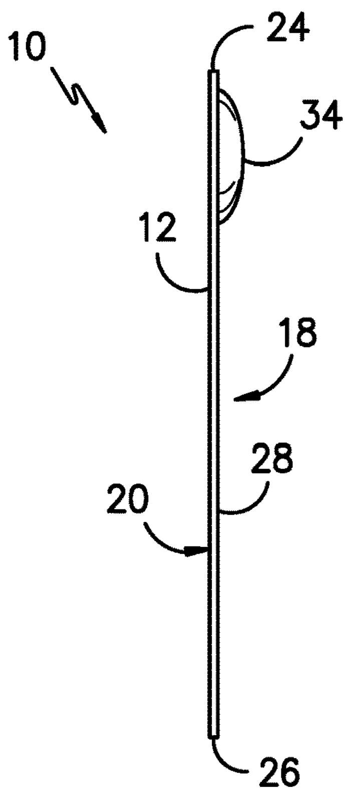
FIG. 1B is a side elevation view of one embodiment of a medication information and storage device where a cavity protrudes from the front surface of the card.
Figure 1C:
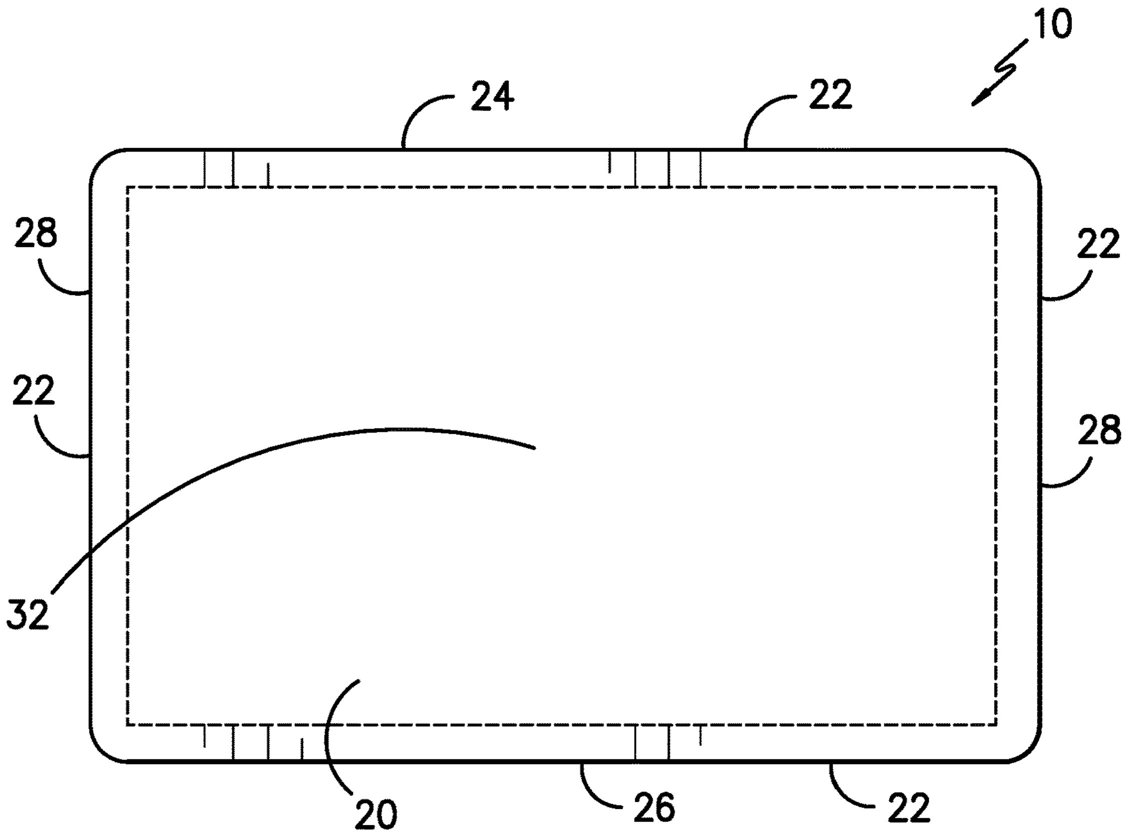
FIG. 1C is a rear elevation view of one embodiment of a medication information and storage device where information can be printed within the area defined by the broken lines.

The present invention is drawn to a medication information and storage device 10 which an individual can carry on their person and keep on hand which has medication and information 32 about the medication and possibly about a relevant health condition, including symptoms, and when taking the medication can help stop or lessen some of the negative effects of the condition. A first embodiment of the device 10 is illustrated in FIGS. 1A-1C that includes a card 12 with a cavity 34 for housing medication and information 32 about the medication for which immediate consumption may be helpful during a health condition. In the Figures, including FIGS. 1A and 1C, the area defined by broken lines 32 represents that area within which information may be printed.

Card

Figure 2A:
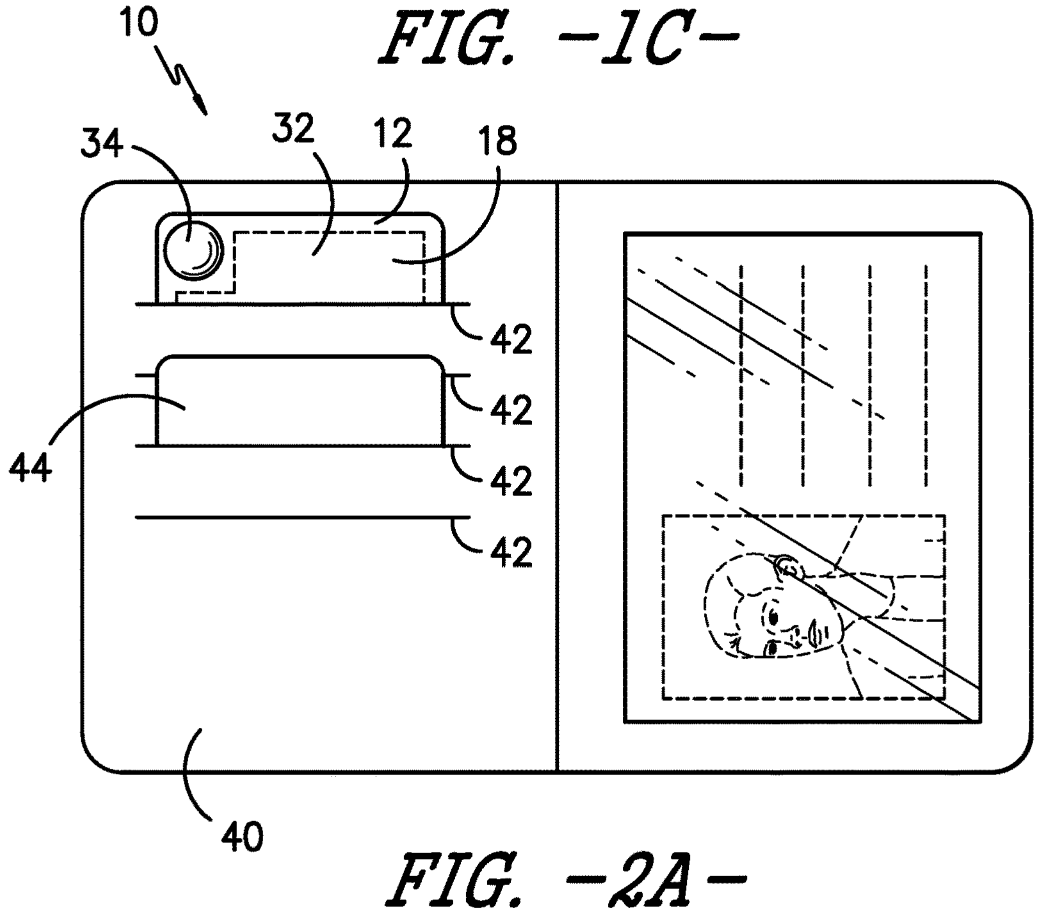
FIG. 2A is a front elevation view of one embodiment of a medication information and storage device within an open wallet where a portion of the device is inserted in a standard card slot but the cavity remains outside of the card slot.
Figure 2B:
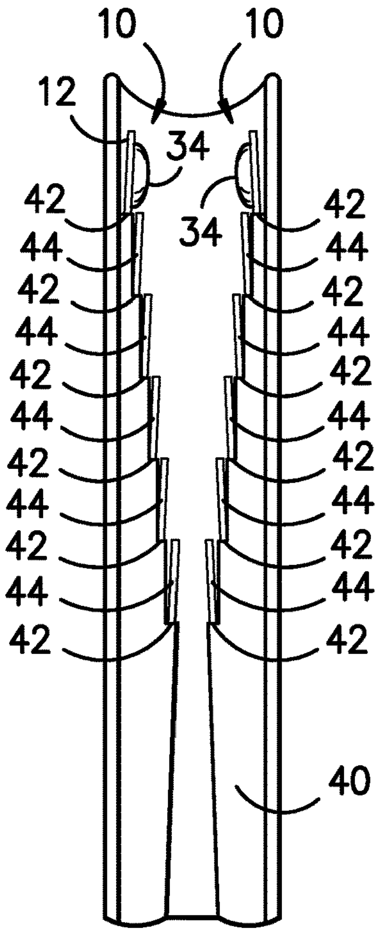
FIG. 2B is a side elevation view of one embodiment of a medication information and storage device within a closed wallet where a portion of the device is inserted in a standard card slot but the cavity remains outside of the card slot and where the wallet thickness has been increased due to the addition of other cards.
Figure 3:
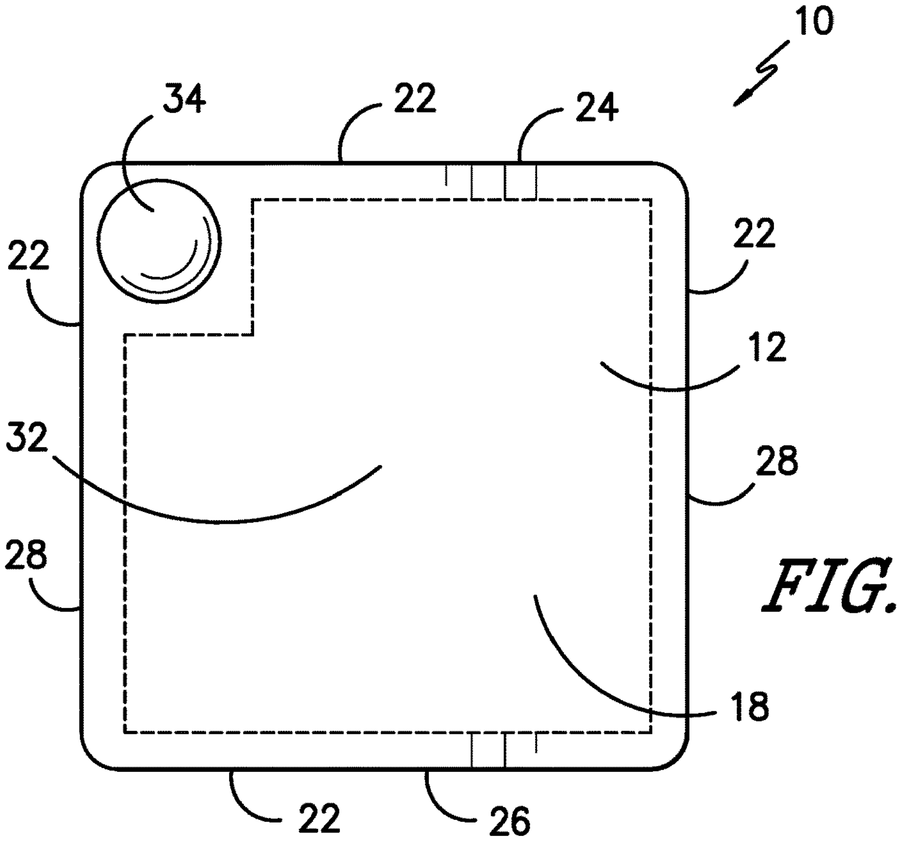
FIG. 3 is a front elevation view of one embodiment of a medication information and storage device where the shape of the card is square and where information can be printed within the area defined by the broken lines.
Figure 9:
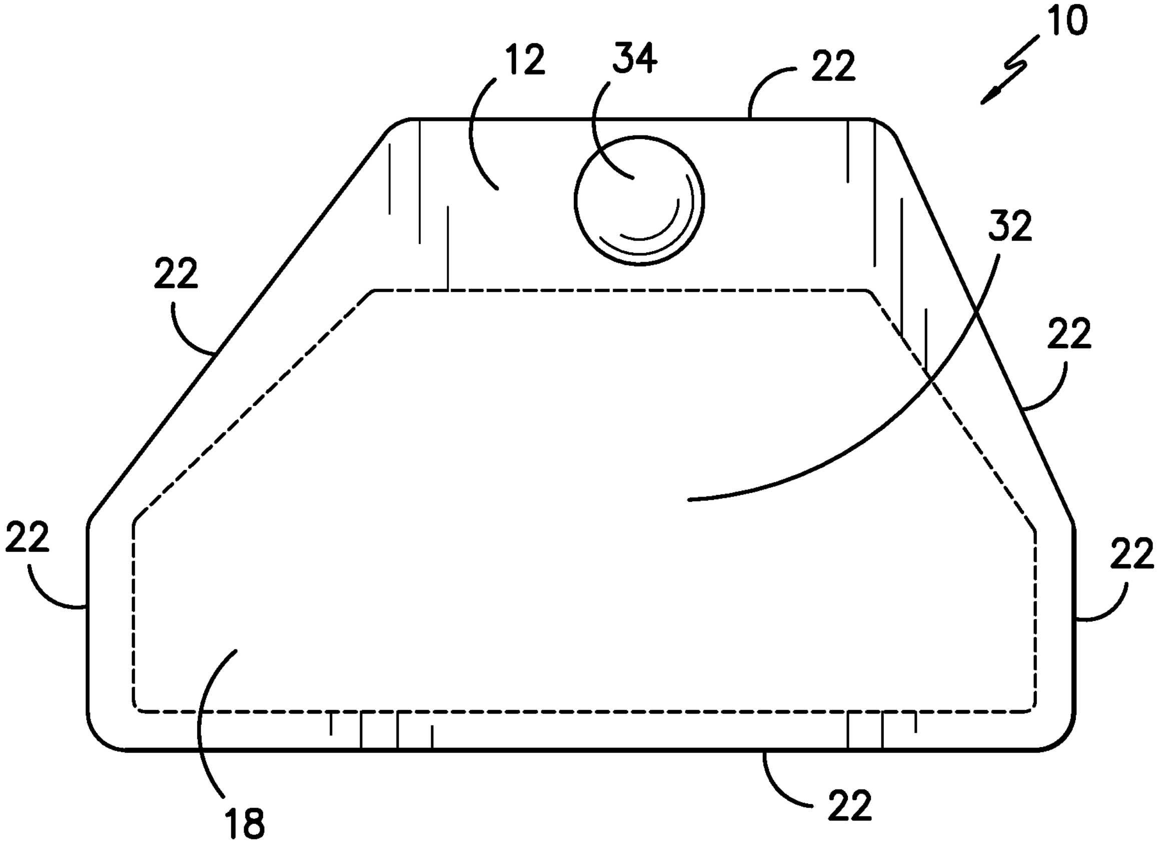
FIG. 9 is a front elevation view of one embodiment of a medication information and storage device with a card in the shape of an irregular hexagon and where information can be printed within the area defined by the broken lines.
Figure 10:
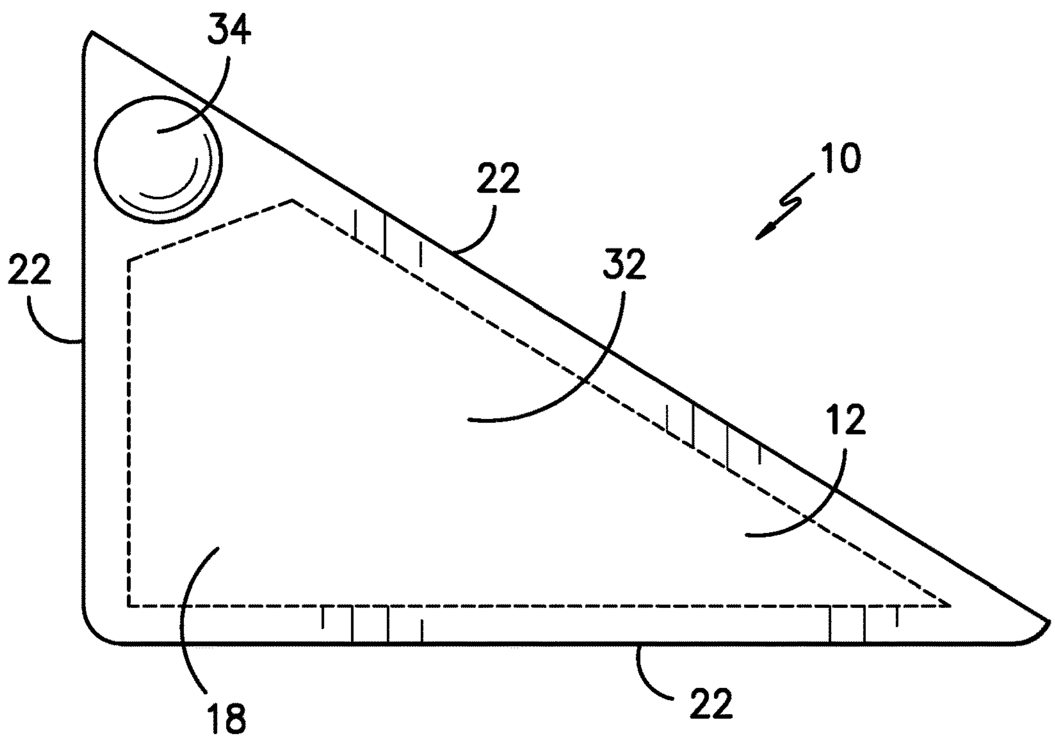
FIG. 10 is a front elevation view of one embodiment of a medication information and storage device with a card in the shape of a triangle and where information can be printed within the area defined by the broken lines.

The card 12 of this first embodiment includes a front surface 18, rear surface 20, and edges 22, including a top edge 24, bottom edge 26, and side edges 28. However, it is anticipated that in alternative embodiments, that the card 12 may have more or less edges 22. It is preferred that the card 12 be similar in shape and size to a standard credit card 44 or driver’s license, so the device 10 may fit within a standard wallet card slot 42, as seen in FIGS. 2A and 2B. The standard physical dimensions for a credit card 44 or driver’s license are defined by the International Organization for Standardization as 85.60 millimeters by 53.98 millimeters with a thickness of 0.76 millimeters and further identified as ID-1 format. However, it is anticipated that the card 12 of this embodiment may have any dimensions and shape. For example, the card 12, or portions thereof, may be larger or smaller in length, height, or width than specified by the ID-1 format, as in FIG. 3. Preferably, the card 12 has a size and shape that allows a portion of that card 12 to be inserted and secured within a standard wallet card slot 42. For example, the card 12 of the device may be a square, as in FIG. 3, irregular hexagon, as in FIG. 9, or a triangle shape, as in FIG. 10, wherein a portion of the card 12 may be inserted and secured within a wallet card slot 42. However, the card 12 may be sized and shaped in any manner, including one which does not allow a portion of the card 12 to be inserted into a standard wallet card slot 42.

Information

Moreover, relevant information 32 about the medication and condition may be preferably located on the front surface 18 of the card, as in FIG. 1A. However, it is anticipated that relevant information 32 may also be located on the rear surface 20, as in FIG. 1C, or both surfaces 18, 20 of the card. This information 32 may include symptoms of a condition, the best time to take a medication for a condition, other steps an individual may take to lessen the negative effects of a condition, or what to avoid to prevent a condition or lessen its effects. However, the card 12 may also include information 32 about the medication itself without any mention of a condition. For example, the information 32 may include the name, dosing, benefits, and side effects of a medication.

Cavity

In a particular embodiment, the card 12 includes a cavity 34 located in a corner at the top of the card 12, i.e. adjacent the top edge 24 and a side edge 28, as seen in FIG. 1A. It is also anticipated that more than one cavity 34 may be disposed in a corner at the top of the card 12, as desired. In a preferred embodiment, the cavity 34 may be sealed. The cavity 34 may be sealed in a manner that will not allow for the resealing of the cavity 34 once opened, so device 10 only facilitates a single use, or may be resealable through mechanisms known in the art to facilitate reuse of the device 10. However, it is anticipated that in an additional embodiment, the cavity 34 may not be sealed. Moreover, it is anticipated that the cavity 34 may also be removable from the card 12. For example, a section of the card 12 containing the cavity 34 may be perforated to facilitate removal of that section from the remainder of the card 12. In addition, the cavity 34 may also be replaceable relative to the card 12. For example, in one embodiment, the card 12 may define an opening through which a cavity 34, such as the cavity of a blister package, may be inserted and removed as necessary.

As seen in FIGS. 2A and 2B, the location of the cavity 34 in a top corner of the card 12 facilitates the insertion and securing of a portion of the device 10 within a wallet card slot 42 while the cavity 34 remains outside of the card slot 42. The cavity 34 remaining outside of the wallet card slot 42 reduces the chances of the medication and cavity 34 being crushed or injured due to pressure from the wallet 40 and its contents while being transported therein. The chances the cavity 34 and medication are crushed or injured are reduced because the cavity 34 occupies the open space, or gap, in the wallet 40 created by the added thickness of the additional contents of the wallet 40, including credit cards 44, as seen in FIG. 2B.

Figure 4:
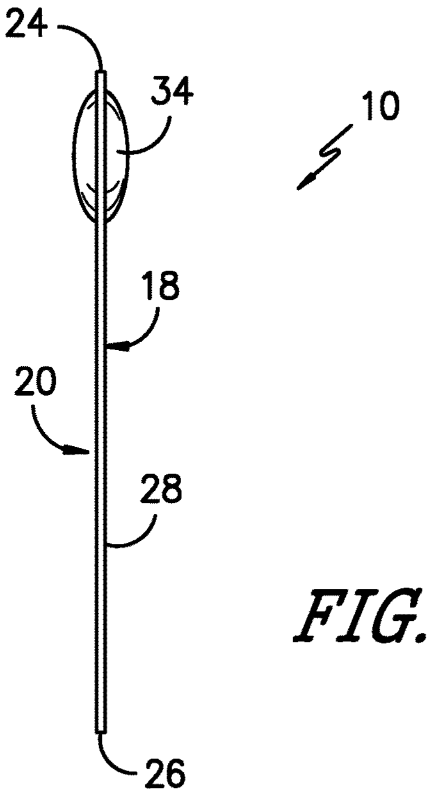
FIG. 4 is a side elevation view of one embodiment of a medication information and storage device where the cavity protrudes from both the front and rear surfaces of the card.

The cavity 34 may contain medication useful to a particular health condition. For example, the cavity 34 may contain a dose of aspirin in the event of a heart attack. However, the cavity 34 may contain one or more medications for any purpose. For example, the cavity 34 may contain one or more vitamins for daily supplementation. In a preferred embodiment, the cavity 34 protrudes from the front surface 18 of the card 12 as in FIG. 1B. However, it is also anticipated that the cavity 34 may protrude from both the front 18 and rear surface 20 of the card 12, as in FIG. 4.

Additional Embodiment

Figure 5A:
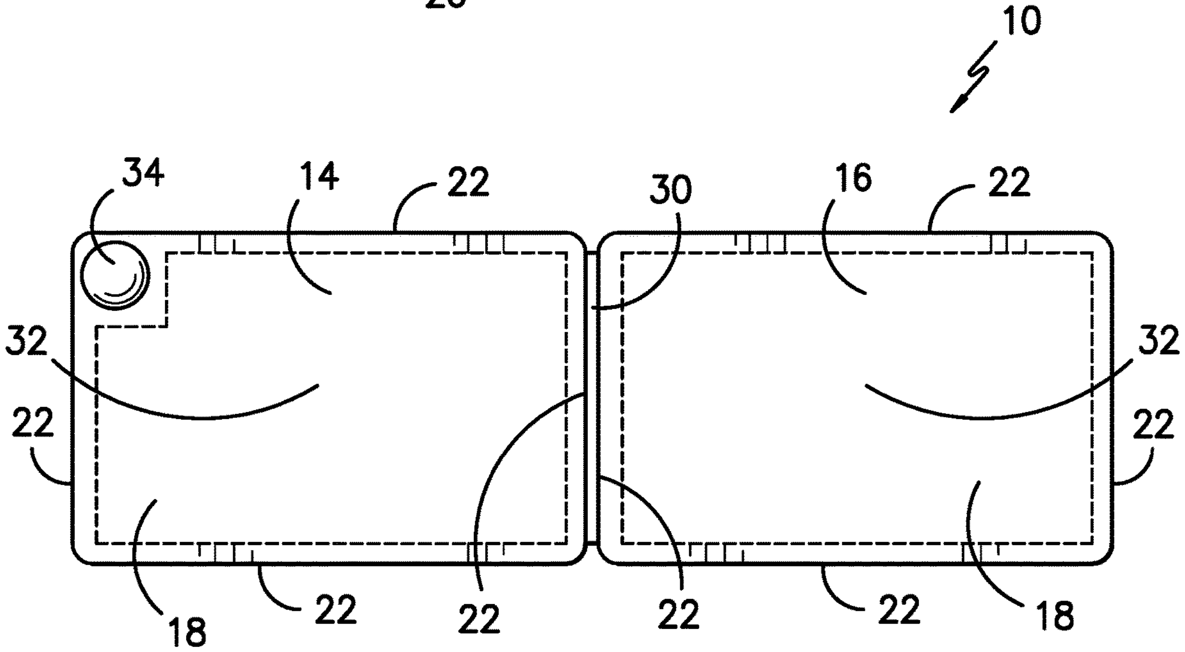
FIG. 5A is a front elevation view of one embodiment of a medication information and storage device with two cards connected together so they may be folded together and where information can be printed within the area defined by the broken lines.

In an additional embodiment shown in FIG. 5A, the device 10 includes two cards a first card 14 and second card 16 connected together in a hinged manner, at a point 30, so that the cards 14, 16 may be folded into contact with each other, a cavity 34 for housing medication in a corner of the first card 14, and relevant information 32 regarding the medication and a health condition on one or both of the cards 14,16.

Cards

Figure 5B:
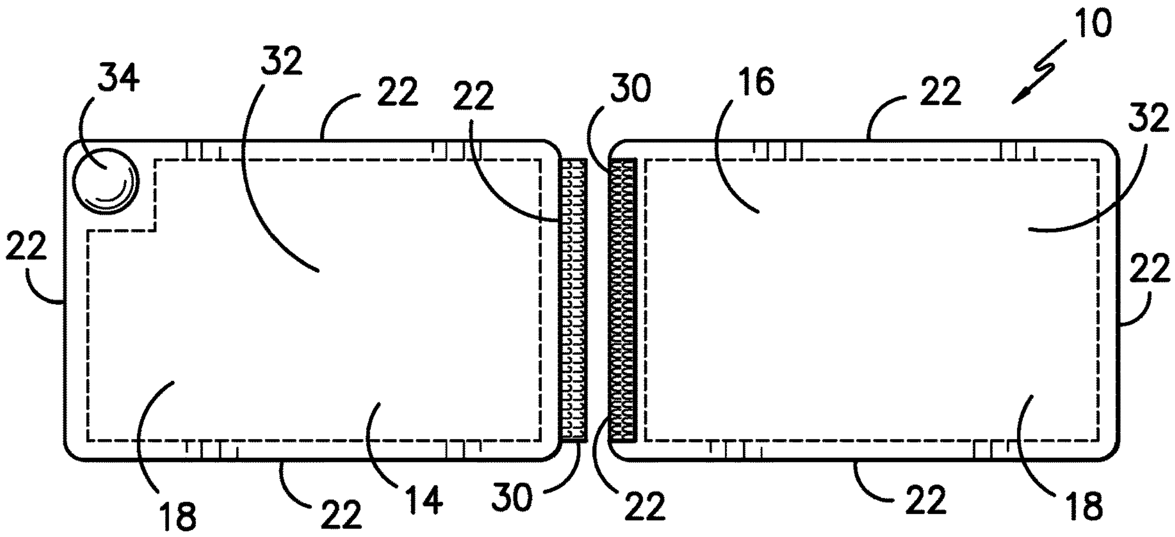
FIG. 5B is a front elevation view of one embodiment of a medication information and storage device with two cards, shown separated, which can be removably connected and where information can be printed within the area defined by the broken lines.
Figure 6A:
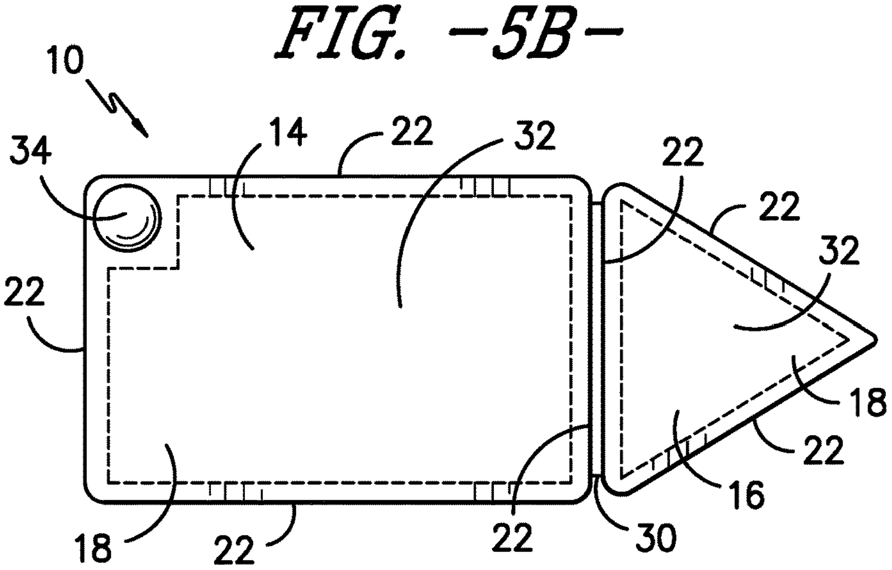
FIG. 6A is a front elevation view of one embodiment of a medication information and storage device with two cards connected together so they may be folded together, where one of the cards has a triangle shape, and where information can be printed within the area defined by the broken lines.
Figure 6B:
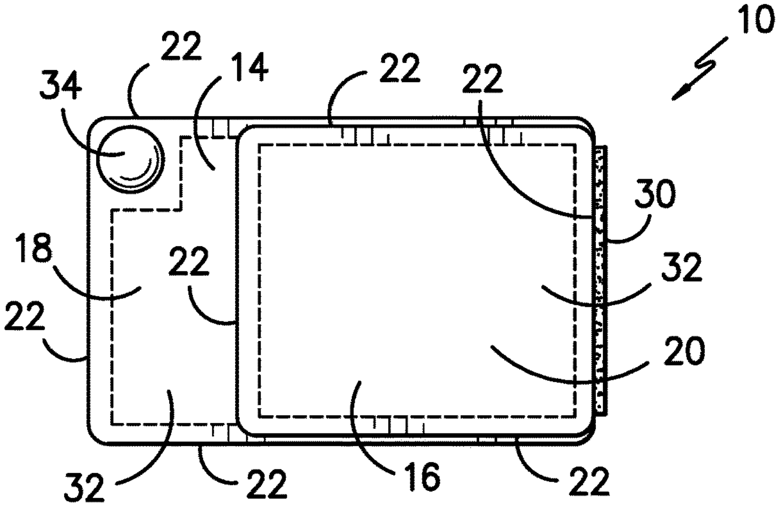
FIG. 6B is a front elevation view of one embodiment of a medication information and storage device with two cards connected and folded together, where one of the cards has a square shape and smaller dimensions than the other, and where information can be printed within the area defined by the broken lines.
Figure 11:
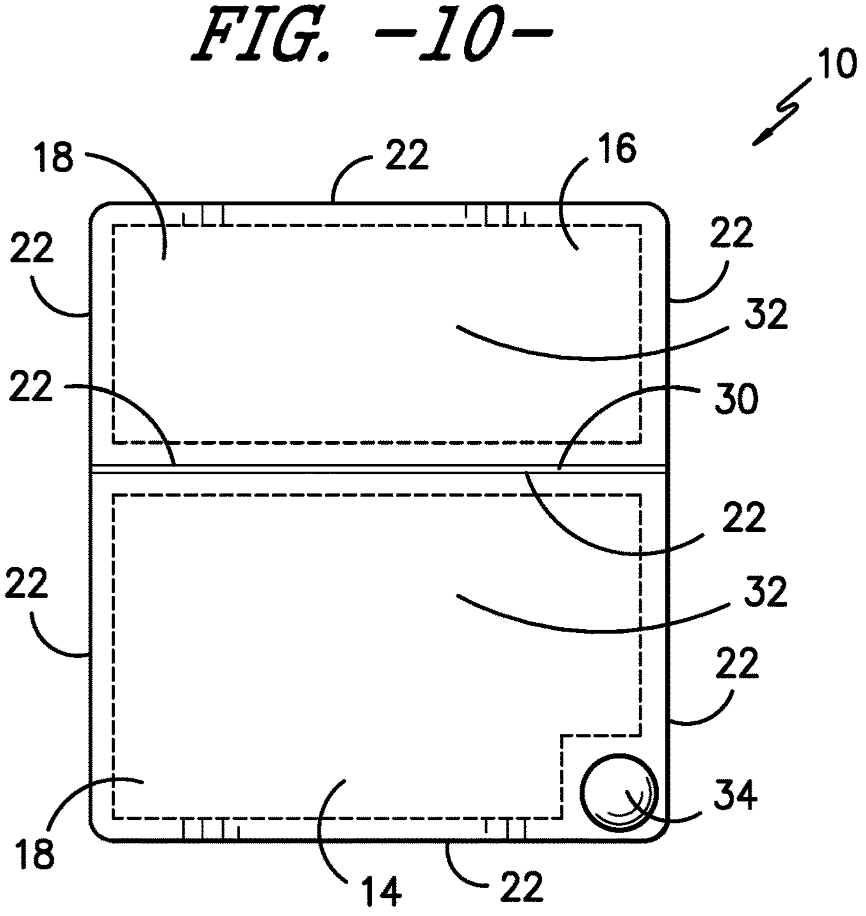
FIG. 11 is a front elevation view of one embodiment of a medication information and storage device with two cards integrally formed together and where the connection point between the cards is defined by a crease so the cards may be folded together.
Figure 12:
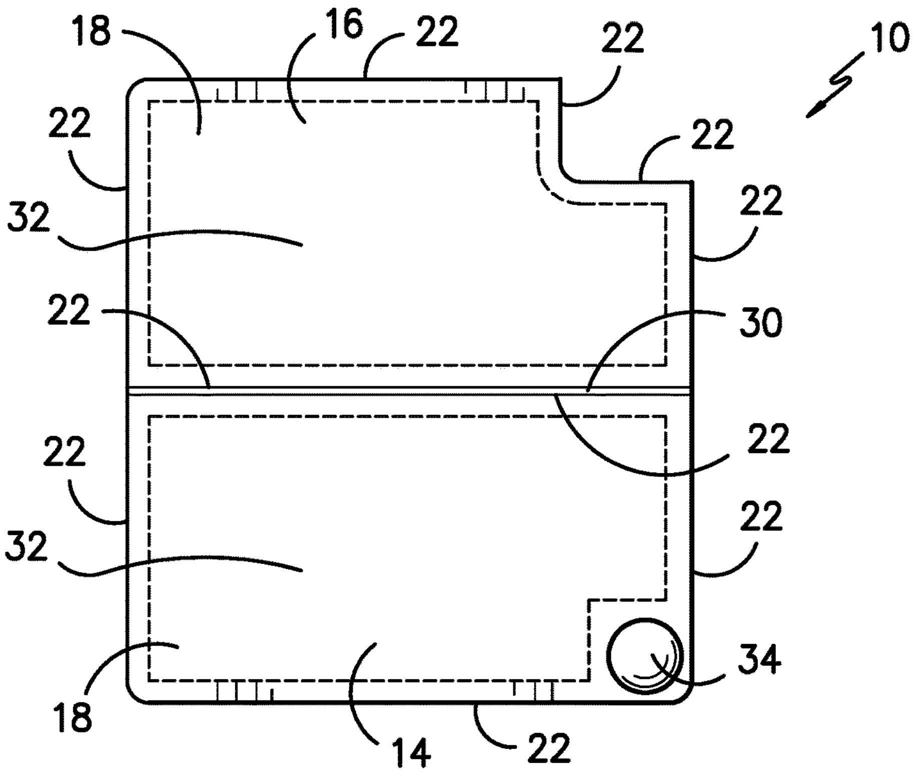
FIG. 12 is a front elevation view of one embodiment of a medication information and storage device with two cards integrally formed, with a crease along the connection point for folding the cards together, and where the second card is shaped so that it substantially covers the entire first card except the cavity when the surfaces of the cards are folded together.

Having more than one card 12 expands the surface area upon which information 32 may be printed. The first 14 and second cards 16 of the two card embodiment have a front surface 18, rear surface 20, and edges 22. In a preferred embodiment, the first 14 and second cards 16 may have substantially the same shape and size as in FIGS. 5A and 5B. For example, the first card 14 and second card 16 may have a shape and size substantially matching that of the ID-1 format, as in FIGS. 5A and 5B. However, it is also anticipated that the first 14 and second cards 16 may also have different shapes and dimensions to facilitate the printing and reading of information 32. For example, the first card 14 may be of a shape and size similar to a credit card 44 while the second card 16 may have a triangle shape and be of a size to fit within the area of the first card 14, as in FIG. 6A. Alternatively in other embodiments, while the first card 14 may be of a shape and size similar to a credit card 44, the second card 16 may be a square shape as in FIG. 6B, a rectangular shape as in FIG. 11, or even an irregular polygon as in FIG. 12. In addition, in embodiments like those of FIGS. 6A, 6B, and 12, the second card 16 may be shaped so as to not interact with the cavity 34 on the first card 14.

Figure 7A:
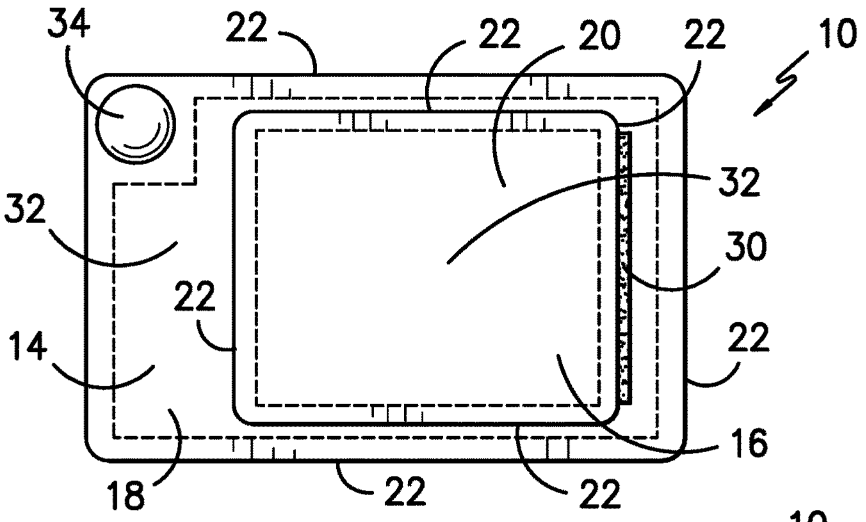
FIG. 7A is a front elevation view of one embodiment of a medication information and storage device with two cards where one of the cards is connected to the surface of the other, where one of the cards has different dimensions, and where information can be printed within the area defined by the broken lines.
Figure 13:
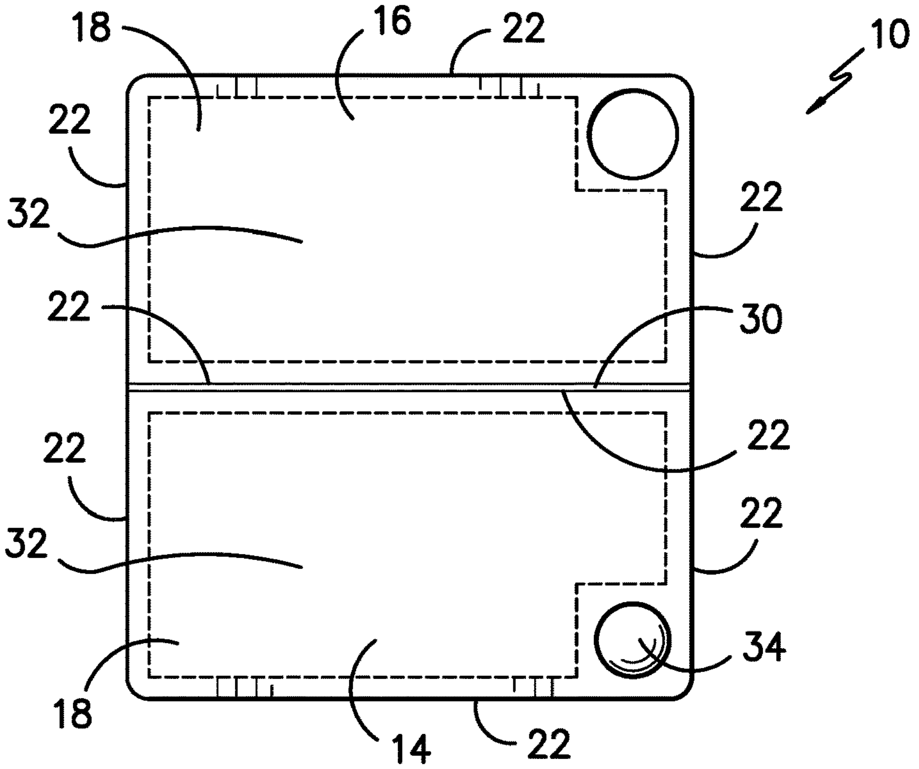
FIG. 13 is a front elevation view of one embodiment of a medication information and storage device with two cards integrally formed, with a crease along the connection point for folding the cards together, and where the second card defines a hole through which the cavity may pass when the surfaces of the cards are folded together.

In a two-card embodiment, the first card 14 and second card 16 are connected together in a hinging manner at the connection point 30 so they may be folded into contact with each other. In a preferred embodiment, the first 14 and second cards 16 may be connected together at one or more points 30 along an edge 22 of each as in FIGS. 5A and 5B. However, it is also anticipated the second card 16 may be connected at one or more points 30 on a surface 18, 20 of the first 14, as in FIGS. 7A and 7B. In further alternate embodiments, the connection of the first 14 and second cards 16 may be permanent or removable so that the cards 14, 16 may be separable, as in FIG. 5B. Additionally, in one embodiment, the first card 14 and second card 16 are connected together in a hinging manner by being integrally formed at a connection point 30 and creased so that the first card 14 and second card 16 may fold into contact, as in FIGS. 11, 12, and 13. For example, the first card 14 and second card 16 may be integrally formed along an edge 22 of each and creased along those edges 22 so the surfaces of first card 14 and second card 16 may be folded into contact.

Means for Securing Cards in Folded Contact

Figure 7B:
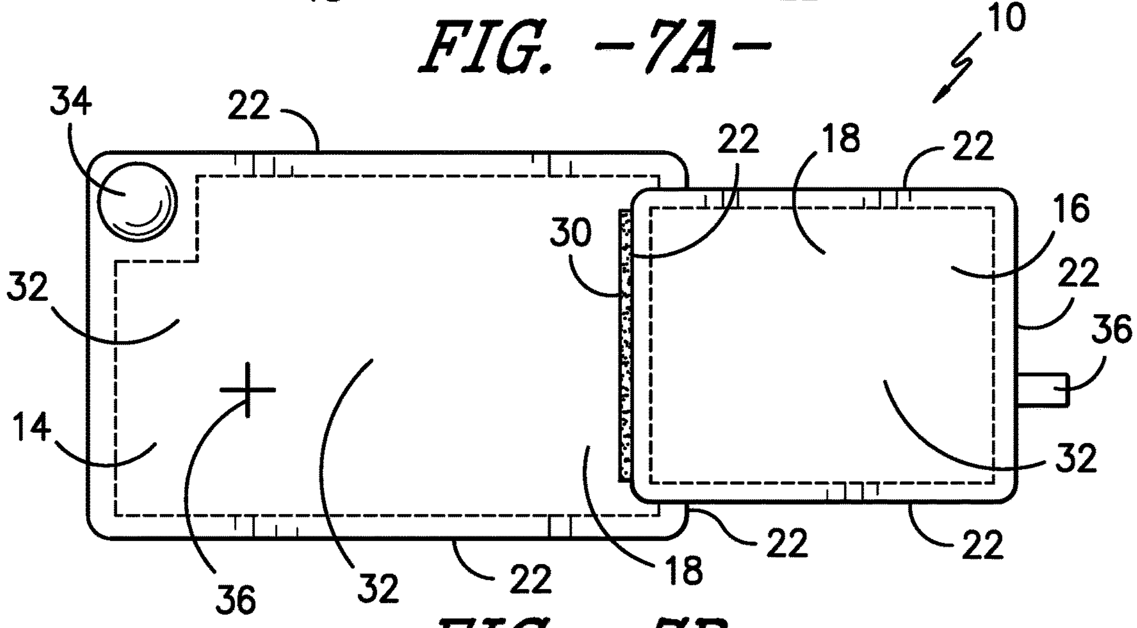
FIG. 7B is a front elevation view of one embodiment of a medication information and storage device with two cards where one of the cards is connected to the surface of and has different dimensions than the other, where one of the cards has a tab which can be inserted and secured by slits in the other, and where information can be printed within the area defined by the broken lines.

Further, in an additional embodiment, the device 10 of the two-card embodiment may also include a means for securing the second card to the first in folded contact 36, thereby helping prevent damage to the device 10, as in FIG. 7B. Examples of such means for securing 36 include, but are not limited to, hook and look fasteners, glue, a tab in one surface which may be inserted through a slit in an adjacent surface, and the like. There are many additional means for securing 36 the cards 14, 16 together, and one skilled in the art will recognize that any suitable means for securing 36 the cards 14, 16 together may be employed.

Cavity

Figure 8A:
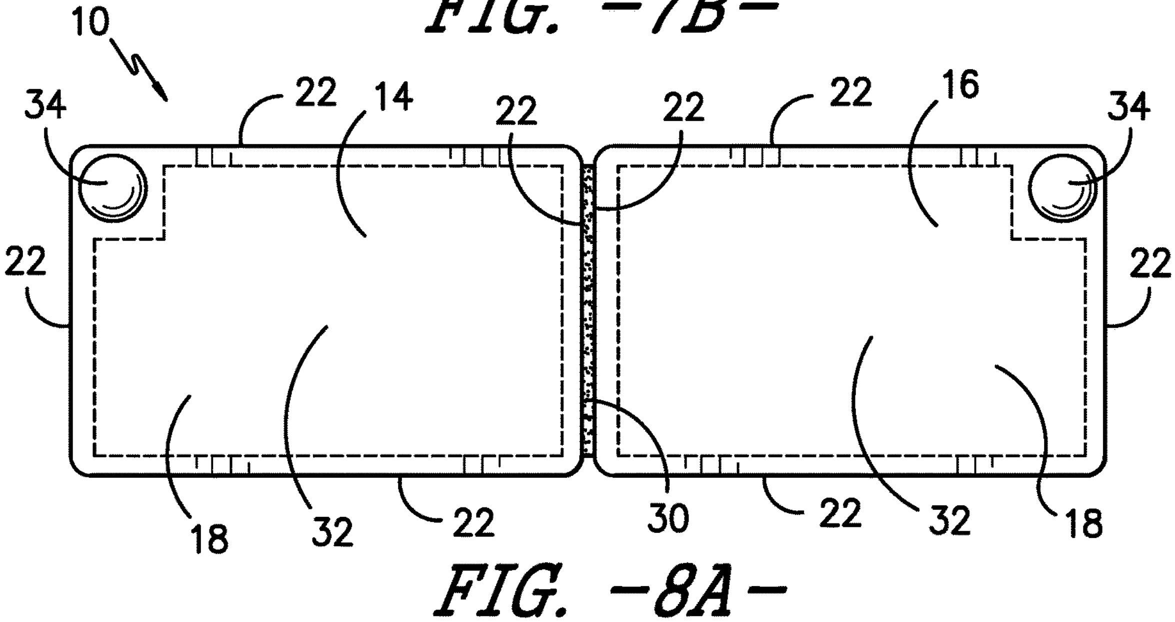
FIG. 8A is a front elevation view of one embodiment of a medication information and storage device with two cards connected so they may fold together where both cards have cavities which are unsealed so that when the cards are folded together they adjoin one another to form a single cavity and seal medication therein and where information can be printed within the area defined by the broken lines.
Figure 8B:
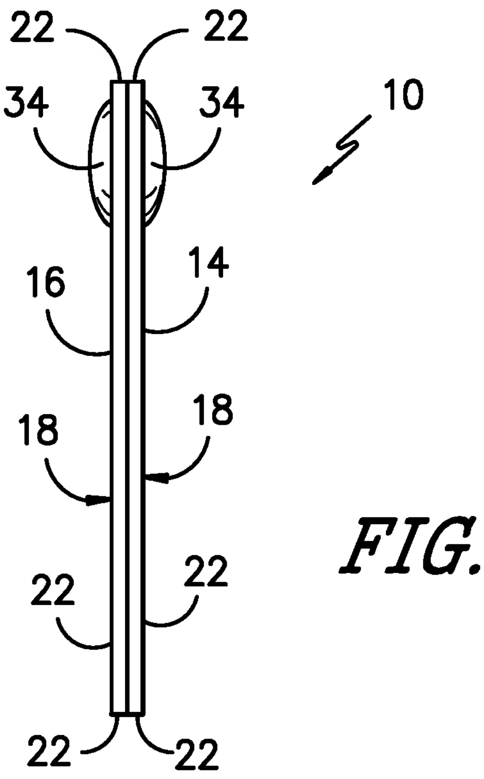
FIG. 8B is a side elevation view of one embodiment of a medication information and storage device with two cards with cavities folded together so medication can be sealed therein.

The two-card embodiment of the device 10 also includes a cavity 34, for housing medication, in a corner of the first card 14, i.e. adjacent two edges 22 thereof, and protruding from one or more of the surfaces 18, 20 of the first card 14. It is also anticipated that more than one cavity 34 may be disposed in a corner of the first card 14, as desired. In a preferred embodiment, the cavities 34 can be sealed. However, it is also anticipated that the cavity 34 may not be sealed. Further, in an additional embodiment, the device 10 of the two-card embodiment may also include one or more cavities 34 disposed on the second card 16 which, when the second card 16 is folded into contact with the first card 14, adjoins one or more cavities 34 of the first card 14, as in FIGS. 8A and 8B, thereby sealing medication therein. A cavity 34 on the second card 16 adjoining with a cavity 34 on the first card 14 can facilitate the use of larger size medication with the device 10 and the reuse of the device 10. Moreover, in an embodiment like that of FIG. 13, the second card 16 may have a hole through which the cavity 34 on the first card 14 may pass when the second card 16 is folded into contact with the first 14.

Composition

The device 10, in certain embodiments, may be constructed of or with a variety of materials which, in one or more aspects, allow for the storage and transportation of medication in a secure, convenient, and protected manner, the easy insertion of the device 10 into a wallet credit card slot 42, the medicine to be on hand when necessary, and thereupon information 32 about a health condition and the relevant medicine may be printed. Examples of possible materials include, but are not limited to, paper, cardboard, polymer, cloth, wood, metal, and rubber.

Operation

In use of one embodiment, an individual places this device 10 for a particular health condition with medication that can help stop or lessen the negative effects of that condition in a card slot 42 in a wallet 40 which they carry about a pocket or purse so they know exactly where the medication is located and have it on hand when needed. When that individual begins experiencing symptoms of what is believed to be that particular health condition, such as a heart attack, they may remove this device 10 from their wallet 40 and read the information 32 thereupon regarding the condition and the medication contained within the device 10 for the condition. If, after reading the information 32, the individual still believes they are experiencing the condition and that taking the medicine would benefit them, they can remove the medication from the cavity 34 and consume it.

In use of an alternative embodiment, an individual places this device 10 with medication and information 32 on the medication in a safe place. When the individual desires or needs to utilize that medication, such as when an individual desires to take a supplement prior to workout, that individual can retrieve the device 10 from the safe place, read the information 32 on the medication, and utilize the medication.

Although the present invention has been described in considerable detail with possible reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features. Further, it is not necessary for all embodiments of the invention to have all the advantages of the invention or fulfill all the purposes of the invention.

In the present description, the claims below, and in the accompanying drawings, reference is made to particular features of the invention. It is to be understood that the disclosure of the invention in this specification includes all possible combinations of such particular features. For example, where a particular feature is disclosed in the context of a claim, that feature can also be employed, to the extent possible, in aspects and embodiments of the invention, and in the invention generally.

Lastly, although the description above contains many specificities, these should not be construed as limiting the scope of the embodiments but as merely providing illustrations of some of several embodiments. Thus the scope of the embodiments should be determined by the appended claims and their legal equivalents, rather than by the examples given.

What is claimed is:

1. A medication information and storage device comprising:

a first card having a front surface, a rear surface opposite said front surface, and edges disposed along said perimeter of said first card;

a second card having a front surface, a rear surface opposite said front surface, and edges disposed along said perimeter of said second card;

said first card and said second card being connected together in a hinging manner so that said front surface of said second card can fold into contact with a portion of said front surface of said first card, and wherein said first card and said second card may pivot with respect to one another between an open and closed position;

at least one sealed cavity, for housing medication, disposed on a top third of said first card and protruding outwardly from at least one of said surfaces of said first card creating a raised protrusion away from said first card, wherein said front surface and said rear surface of said second card are flat and said second card includes a cut-out portion that corresponds to a position of said cavity so that when said first card and said second card are folded together, said cavity protrudes through said cut-out portion of said second card and said first and second cards lie flat against one another, and wherein said rear surface and bottom two thirds of said front surface of said first card are flat so that said medication information and storage device may slide into a pocket of a wallet so that said cavity protrudes outwardly above said pocket; and information regarding said medication printed on at least one of said front surfaces of said cards.

2. The medication information and storage device of claim 1, wherein said cavity also protrudes outwardly from said rear surface.

3. The medication information and storage device of claim 1, wherein said second card has substantially the same shape and dimensions as said first card.

4. The medication information and storage device of claim 1, wherein said second card has a different shape and different dimensions than said first card.

5. The medication information and storage device of claim 1, wherein said second card has at least one cavity disposed thereupon which, when said first and second cards are folded into contact, adjoins at least one cavity in said first card.

6. The medication information and storage device of claim 1, wherein said first card and said second card are removably connected.

7. The medication information and storage device of claim 1, further including a means for securing a surface of said first card and a surface of said second card ire contact when said cards are folded together.

8. The medication information and storage device of claim 1, wherein said card has a triangular shape.

9. The medication information and storage device of claim 1, wherein said cavity is positioned adjacent a corner of said first card, so that said medication information and storage device may be stored in a slot of a wallet in either a horizontal or vertical orientation while said cavity protrudes outwardly from said first card and above said slot in said wallet.

* * * * *